US 6,732,498 B2

(12) United States Patent
Keen et al.

(10) Patent No.: US 6,732,498 B2
(45) Date of Patent: May 11, 2004

(54) VACUUM ASSISTED CUT-AND-SEAL APPARATUS WITH TRANSFER WHEEL

(75) Inventors: Bruce W. Keen, Chatanooga, TN (US); Ira Greene, Birchwood, TN (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 09/893,646

(22) Filed: Jun. 29, 2001

(65) Prior Publication Data

US 2003/0009992 A1 Jan. 16, 2003

(51) Int. Cl.[7] .............................................. B65B 51/16
(52) U.S. Cl. ..................... 53/574.4; 198/471.1; 209/905
(58) Field of Search ........................ 53/550, 567, 574.4; 209/905; 198/471.1, 476.1

(56) References Cited

U.S. PATENT DOCUMENTS

| | | | | | |
|---|---|---|---|---|---|
| 3,961,697 | A | * | 6/1976 | Hartman et al. ............. | 414/737 |
| 4,034,537 | A | * | 7/1977 | Reil et al. ...................... | 53/451 |
| 4,183,192 | A | | 1/1980 | Smaw | |
| 4,767,487 | A | * | 8/1988 | Tomsovic, Jr. .............. | 156/256 |
| 4,880,102 | A | * | 11/1989 | Indrebo ................... | 198/418.3 |
| 5,371,999 | A | | 12/1994 | Hansen et al. | |
| 5,678,390 | A | * | 10/1997 | Pruett et al. .................. | 53/450 |
| 5,735,107 | A | * | 4/1998 | Vollenweider et al. ........ | 53/450 |
| 6,098,785 | A | * | 8/2000 | Van Maanen ............ | 198/459.8 |
| 6,122,898 | A | * | 9/2000 | De Kort ....................... | 53/450 |
| 6,178,719 | B1 | * | 1/2001 | Hansen ....................... | 53/374.4 |
| 6,648,122 | B1 | * | 11/2003 | Hirsch et al. .......... | 198/377.08 |

FOREIGN PATENT DOCUMENTS

EP        0897 870        2/1999

* cited by examiner

Primary Examiner—Donald P. Walsh
Assistant Examiner—Daniel K Schlak
(74) Attorney, Agent, or Firm—Fitzpatrick, Cella, Harper & Scinto

(57) ABSTRACT

A piece count and collation system includes a cut-and-seal apparatus including a pair of rotatable members positioned immediately adjacent each other for receiving a tube wrapping containing a plurality of sequentially spaced objects. The rotatable members rotate in opposite directions to one another and each includes a first cutting edge having a first bonding surface positioned immediately adjacent thereto and a second cutting edge spaced apart from the first cutting edge and having a second bonding surface positioned immediately adjacent thereto. At least one of the rotatable members includes a vacuum grasping member positioned between the first and the second cutting edges for grasping one of said plurality of sequentially spaced objects in the tube wrapping received by the cut-and-seal apparatus while the tube-wrapping is cut and bonded on both ends to form a fully wrapped object. The piece count and collation system also includes a conveyor and a hopper for collecting a plurality of fully wrapped objects.

13 Claims, 5 Drawing Sheets

VACUUM ASSISTED CUT-AND-SEAL APPARATUS WITH TRANSFER WHEEL

BACKGROUND OF THE INVENTION

1. Field of the Invention

The present invention relates generally to apparatuses and methods for counting objects in a packaging product line, and more particularly to a piece count and collation system for controlled blending and distributing of confectionary objects (candies) wrapped by a flow-wrap apparatus.

2. Related Background

The great majority of candy bars are packaged by being wrapped and sealed in a film of wrapping material, on which is printed the desired package artwork, logos, etc. Such wraps are generally formed in the following way. A continuous film of the wrapping material is printed with the artwork and the like (this is generally done by the vendor of the film, not by the food packager). In the actual packaging process, the products are deposited in the film with proper registration, so that the individual products line up with the artwork on the film. The film is wrapped around the products and sealed in a continuous seam to form a tubular shape. This tube is then cut into parts at the correct locations to produce individual tubular lengths of film, each containing one product. Both ends of each of these are then sealed by heat sealing methods or cold-seal adhesive, completing the formation of the familiar wrapped product. Commonly, cutting and sealing are performed simultaneously, by a mechanism known as a cut-and-seal device. These techniques are referred to as the conventional "flow-wrap" process.

SUMMARY OF THE INVENTION

The present invention presents new and unique methods and apparatuses for wrapping and packaging objects.

Accordingly, in one aspect of the present invention, a cut-and-seal apparatus includes a pair of rotatable members positioned immediately adjacent each other for receiving a tube wrapping containing a plurality of sequentially spaced objects. The pair rotate in opposite directions. Each includes a first cutting edge having a first bonding surface positioned immediately adjacent thereto and a second cutting edge spaced apart from the first cutting edge and having a second bonding surface positioned immediately adjacent thereto. At least one of the rotatable members includes a vacuum grasping member positioned between the first and the second cutting edges for grasping one of the sequentially spaced objects in the tube wrapping received by the cut-and-seal apparatus while the tube-wrapping is cut and bonded on both ends to form a fully wrapped object.

In another aspect of the present invention, a piece count and collation system includes the cut-and-seal apparatus as described above, and also includes a conveyor, and a hopper for collecting the plurality of fully wrapped objects.

In yet another aspect of the present invention, a piece count and collation system, similar to the previous aspect, also includes a third rotatable member having a second vacuum assisted grasping member for receiving the fully wrapped object from the first vacuum grasping member for transferring to the conveyor, and a diverter positioned downstream from the third rotatable member. The diverter includes a receiving portion, at least two exiting areas and a gate for alternately closing one of the exiting areas. Each exiting area diverts wrapped objects into a respective hopper for collecting.

In yet another aspect of the present invention, a method for counting and collating a plurality of objects in a collation system includes the steps of receiving a plurality of sequentially spaced objects partially wrapped by tube-wrapping, grasping each of the plurality of objects individually by a vacuum assisted grasping member, cutting and bonding ends of each individual partially wrapped object with a cut-and-seal apparatus, transferring the fully wrapped object to a conveyor, and conveying the fully wrapped object away from the cut-and-seal device.

In yet another aspect of the present invention, a method for counting and collating a plurality of objects is presented similar to the previous aspect and also includes the further steps of counting the fully wrapped objects, and diverting the fully wrapped objects into one of at least two hoppers using a diverter.

The conveyor used in the above detailed aspects may be a vacuum conveyor, in which holes in the conveyor belt apply a negative pressure to products on the conveyor. Thus, the negative pressure holds the products in place while transporting the products.

The diverter is positioned downstream from the rotatable members and includes exiting areas each in communication with a respective hopper. The diverter may include a receiving portion having a mechanical gate for alternately closing one of the exiting areas or alternatively, and preferably the diverter includes at least one air-diverting gate to distribute the wrapped objects into the desired exit area.

Each hopper may also include a timing mechanism for allowing wrapped objects stored therein to empty into a container and the like.

The present invention is especially applicable to counting and collating consumer confectioneries, chocolates and candies.

DETAILED DESCRIPTION OF THE PREFERRED EMBODIMENTS

Figure 1:
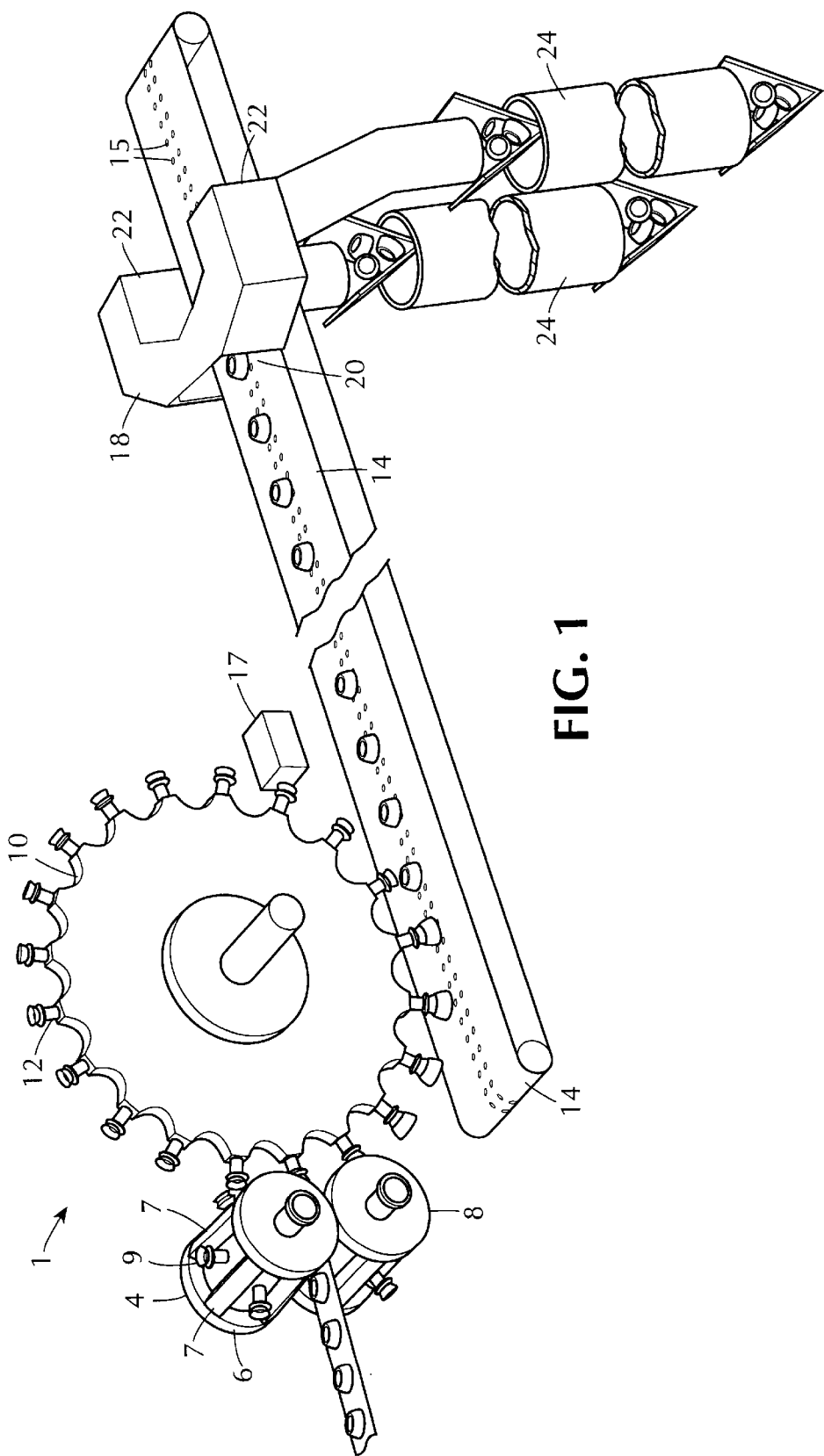
FIG. 1 is a perspective schematic view of a piece count and collation system according to the present invention.
Figure 2:
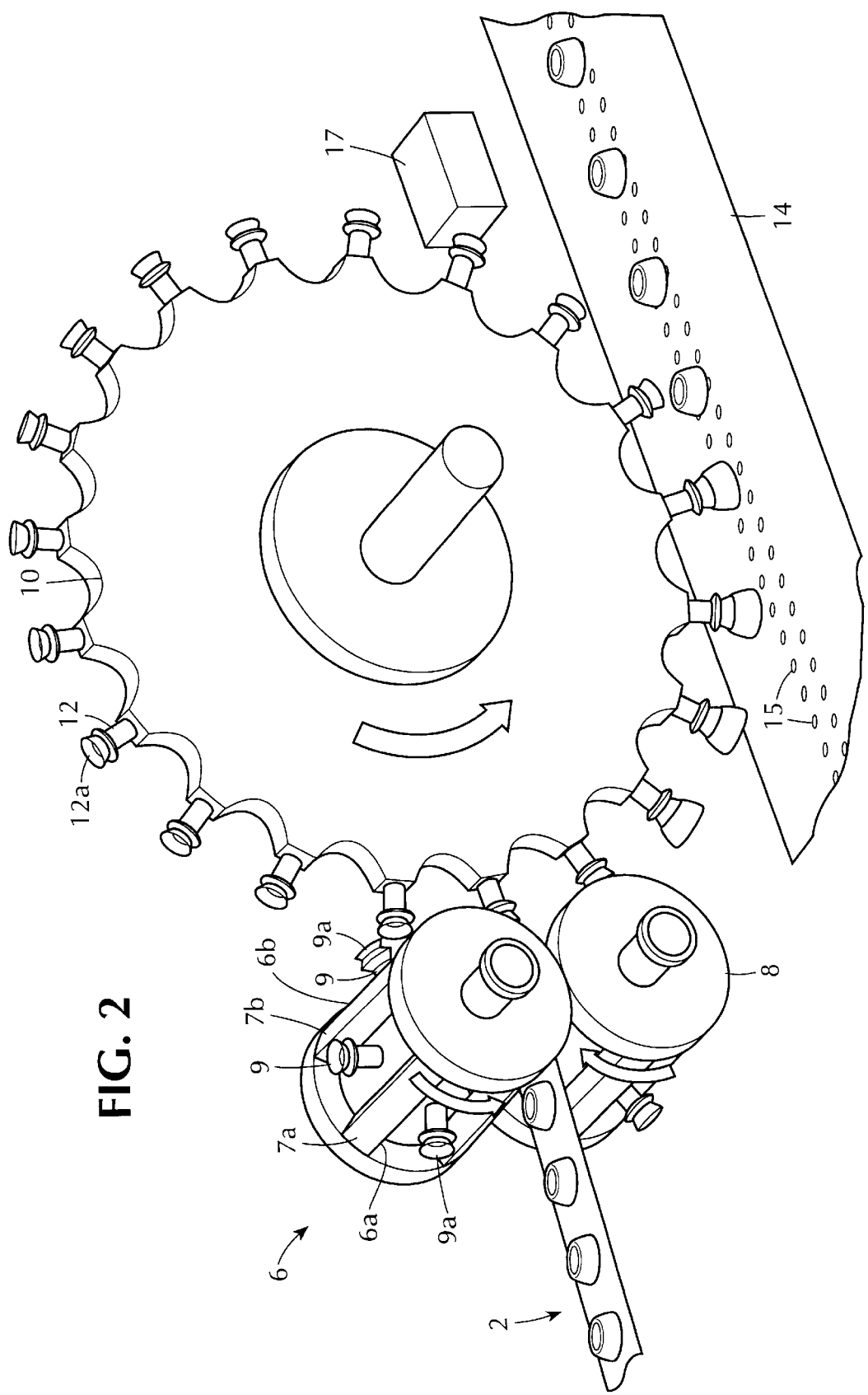
FIG. 2 is a perspective schematic view of a cut-and-seal and transfer mechanism according to the present invention.
Figure 3:
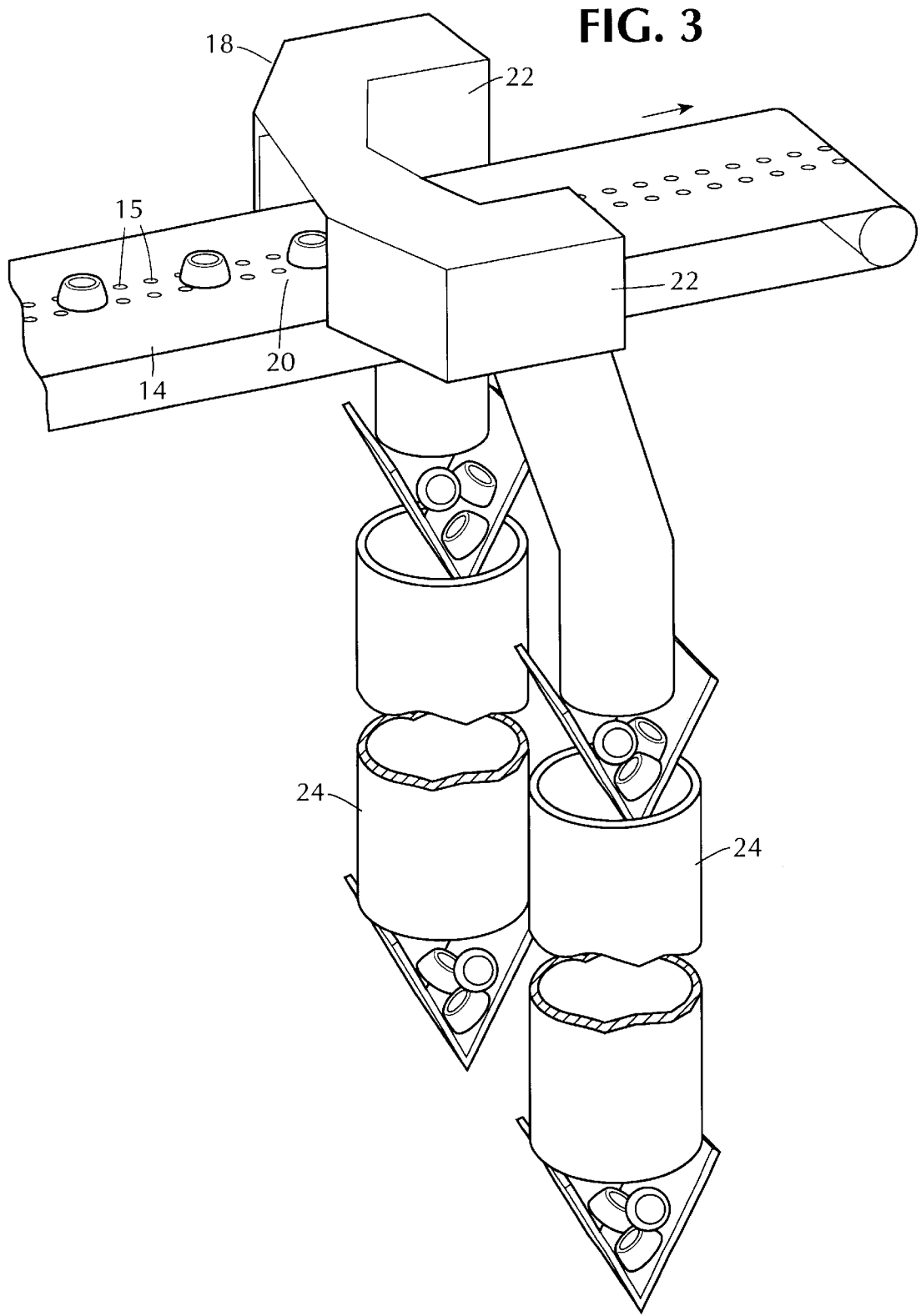
FIG. 3 is a perspective schematic view of a diverter and hopper system for the piece count and collation system according to the present invention.

A piece count and collation system 1 is presented according to the present invention. A plurality of partially wrapped objects 2 are received in a cut-and-seal apparatus 4. The cut-and seal apparatus 4 includes two rotating cylinders 6 and 8, each including a plurality of cutting edges 6a and 6b and bonding surfaces 7a and 7b. The cutting edges and bonding surfaces are spaced apart from one another a distance substantially so that flow wrapped objects received on one end of the cut-and-seal apparatus are cut to form individual flow wraps having a cavity for encapsulating an object.

It is worth noting that each object positioned within the tube wrapping may be a single object spaced apart from one another, or a group of objects where each group is spaced apart from an adjacent group. It is preferable, however, that single objects be arranged within the tube wrapping.

The two rotating cylinders rotate in opposite directions; cylinder 6 rotating counterclockwise, and cylinder 8 rotating clockwise as illustrated in FIG. 1. This action allows the feeding and taking in of partially wrapped objects received in a length of flow wrap.

The partially wrapped objects are arranged and timed such that the approximate center of each is received by at least one rotary vacuum transfer head 9 positioned substantially between two adjacent cutting edges at substantially the center of the object.

As a partially flow-wrapped object is received between the two rotating cylinders, the flow-wrap and corresponding top center of an object is received by a flexible suction cup 9a of a rotary vacuum head 9 located on rotating cylinder 6. In addition, or alternatively, the flow-wrap and corresponding bottom center of the object may also be received by a second flexible suction cup 9a of a second vacuum head 9 positioned on rotating cylinder 8. Preferably, at least one of the rotary vacuum heads should be used to aid in transporting a partially wrapped object through the cut-and-seal apparatus. Most preferably, rotary vacuum head positioned on rotating cylinder 8 is used. Accordingly, the below description of the apparatus and method will be described using a rotary vacuum head positioned on rotating cylinder 8.

Immediately after a suction cup of a rotary vacuum head attaches to the flow-wrap/object, via a vacuum (i.e., negative pressure) a first end of the flow-wrap located on one side of the object is cut between a first cutting edge on rotating cylinder 6 and a corresponding cutting edge on rotating cylinder 8. The flow-wrap located adjacent the cut near the object is bonded together via heat and/or pressure using bonding surface 7a and a corresponding bonding surface positioned on cylinder 8. The flow-wrap material may be heat bondable, i.e., not requiring a separate bonding material, or it may include a heat/pressure activated material within the bonding area of the flow wrap. The spacing between adjacent bonding areas on a single cylinder is referred to as a cavity.

The cylinders are designed such that a plurality of cavities are formed, each having a rotary vacuum head positioned substantially in the center of the cavity for holding an object and corresponding flow-wrap.

As the rotatable cylinders rotate, the flow-wrap located on the other side of the object, starting at a distance away from the object substantially equal to a corresponding distance away from object where the first bonding of the flow-wrap is initiated, is bonded via the same mechanism as the bonding of the first bonding area. Thereafter, through continued rotation of the cylinders, the flow-wrap adjacent the second bonding area and preceding a next object is cut. All the while, the flow-wrap containing the object and the object itself is held in place by the rotary vacuum head.

Thereafter, as the rotating cylinders of the cut-and-seal apparatus continue their rotation, the object now in a fully-sealed (i.e. wrapped) enclosure exits the right side of rotating cylinders still affixed to the suction cup 9a (of cylinder 8 in this example) of the rotary vacuum head.

At that point, as the object remains affixed to a rotary vacuum head on rotating cylinder 8, a suction portion 12a of a second rotary vacuum head 12 positioned on a rotatable transfer wheel 10 receives the top portion of the fully-wrapped object at substantially the center of the object.

Rotating wheel 10 rotates in the same direction A as rotating cylinder 6, and opposite to direction B of rotating cylinder 8. Thus, a fully wrapped object is easily transferred from the rotary vacuum head of cylinder 8 to the rotary vacuum head of rotating wheel 10.

The rotating wheel 10 is spaced apart from rotating cylinder 8 such that the rotary vacuum head of 10 aligns preferably and substantially with an exiting rotary vacuum head of cylinder 8. Thus, when the rotary vacuum head of cylinder 8 having a fully-wrapped objects aligns with a rotary head from the wheel 10, the vacuum applied to the rotary vacuum head of 8 is lessened or positive pressure is applied and, substantially at the same time, vacuum is applied to the rotary vacuum head of wheel 10 receiving the top of the fully-wrapped objects. The object then easily transfers.

For efficiency, the rotary vacuum heads of the rotating wheel 10 are preferably spaced apart along the circumference of the wheel 10 to correspond to each rotary vacuum head of at least one of said rotating cylinder 6 and 8.

The rotating wheel 10 having the fully-wrapped object transports the object to a vacuum conveyor 14. The vacuum conveyor 14 includes a series of holes 15 positioned linearly along substantially the center of the conveyor where a negative pressure is applied to the holes from underneath the conveyor so that objects placed above the holes are held in place by the negative pressure. The holes may be positioned anywhere on the conveyor and the conveyor may also include holes along its entire surface.

The conveyor is preferably spaced apart from the rotating wheel 10 a distance such that a bottom of a fully wrapped object held by a rotary vacuum head is adjacent the conveyor when the particular rotary vacuum head is substantially perpendicular to the surface of the conveyor. At that point, the vacuum applied to the rotary vacuum head having the fully-wrapped object is lessened or a positive pressure is applied, and a vacuum is applied to the area of the conveyor receiving the fully-wrapped objects. One skilled in the art will appreciate that the entire conveyor may be subject to a vacuum or just particular portions.

It is worth noting that the conveyor and rotating cylinder 6 and 8 may be arranged such that a fully-wrapped object may be transferred directly from the rotary vacuum heads to the conveyor surface. Preferably, however, the rotating transfer wheel 10 is used.

Alternatively, all vacuum components of the apparatus may be subject to vacuum at all times (i.e., negative pressure), but to varying degrees such that an object may be passed between components. Accordingly, a partially-wrapped object initially received by rotating cylinder 6 and 8, may be subject to just enough vacuum to hold onto the object. Thereafter, the rotary vacuum heads of wheel 10 may apply a greater vacuum such that the object transfers easily to the rotary vacuum head of wheel 10. Similarly, the vacuum applied at the conveyor is such that the fully-wrapped object coming from rotating wheel 10 easily transfers to the conveyor. All the while, vacuum at each step is never changed.

The fully-wrapped objects positioned on the conveyor are transported away from the cut-and-seal cylinders and transfer wheel to a packaging destination. They may be counted and/or inspected by a device 17 positioned adjacent the conveyor. The device is preferably in communication with a central controller which keeps track of the number of fully-wrapped objects that pass by the device, and may keep track of the condition of the object positioned within the wrapping. The counting/inspection device is useful in determining an empty wrap. If a wrap passes by without an object therein, it is not counted.

As shown in the present invention, the counting device is positioned downstream from the rotating cylinders 6 and 8 and rotating wheel 10.

As the fully wrapped objects pass the counting device, they enter a diverter 18. The diverter includes a receiving area 20 for receiving the fully-wrapped objects, and at least two exit areas 22. Each exit area 22 empties out into a respective hopper 24, which collects objects for a period of time until a central controller (or other device) commands a door (not shown) on the hopper to open and empty the contents into a packaging area. A timing mechanism may also be used to open the door at periodic intervals.

In one embodiment, between the receiving area and the exit area, the bottom surface of the diverter is angled so that wrapped objects entering either exit area will be pulled by gravity into either one of the hoppers. Alternatively, mechanisms familiar to those of skill in the art for transporting the wrapped objects within the diverter may be used. Such mechanisms may include the conveyor being used as a bottom surface of the diverter, a separate conveyor specifically for the diverter, an air-diverting gate and a sweeping mechanism to sweep particles from the receiving area into a respective hopper.

Figure 4:
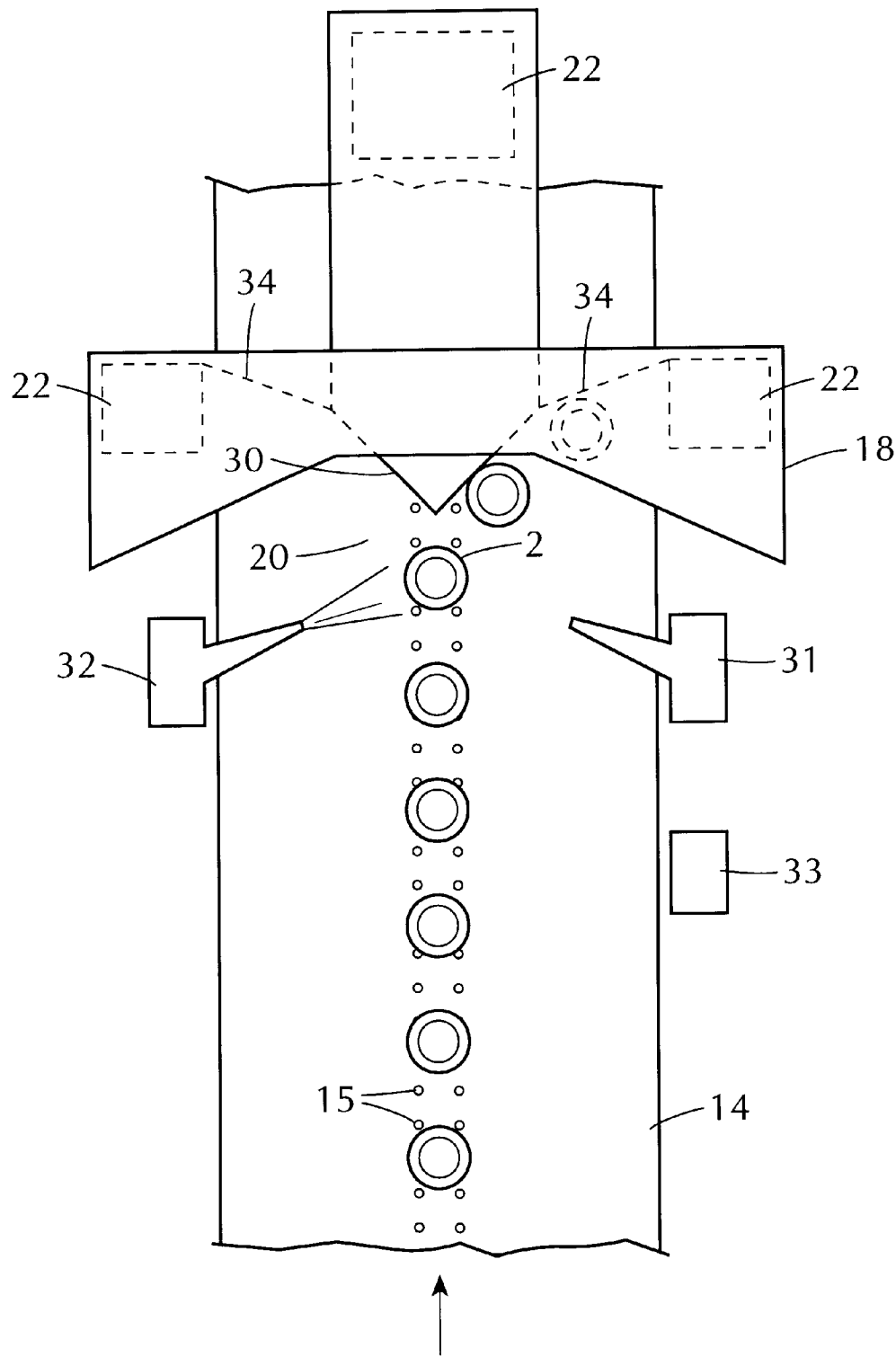
FIG. 4 is a top-plan view of an air-diverter for the piece count and collation system according to the present invention.

FIG. 4 illustrates a preferred diverter 18 stationed at the end of vacuum conveyor 14 with vacuum holes 15. This embodiment provides the option of directing the wrapped object 2 into one of 3 exit areas. A V-shaped diverting block 30 is centered at the receiving area 20 and the receiving area is flanked on each side by air diverting gates 31 and 32. Sensor 33 is used to count wrapped objects 2 and may be used to count the pieces for each exit area and then provide a signal to activate/deactivate the air diverting gates or to raise V-shaped diverting block 30 while deactivating both air diverting gates 31 and 32 and allow the wrapped objects to proceed to the central exit 22. As illustrated, diverter 18 also includes diverting assistance walls 34 which may be a part of V-shaped diverting block 30 or a separate wall in diverter 18. It should be apparent that the diverter used in this invention may be comprised of only 2 exit areas. For example, in another embodiment the V-shaped diverting block 30 could be fixed and diversion of the wrapped objects 2 limited to either the left or right exit areas 22 by activation/deactivation of air diverting gates 31 and 32. Yet another embodiment could include a movable V-shaped diverting block 30 in combination with one air diverting gate so that central exit 22 and either a left or right exit 22 is employed. It should also be noted that if a vacuum conveyor 14 is employed it is preferred to deactivate the negative pressure communicated via vacuum holes 15 at the receiving area 20 to facilitate movement of the wrapped objects 2 by the air diverting gates.

Figure 5:
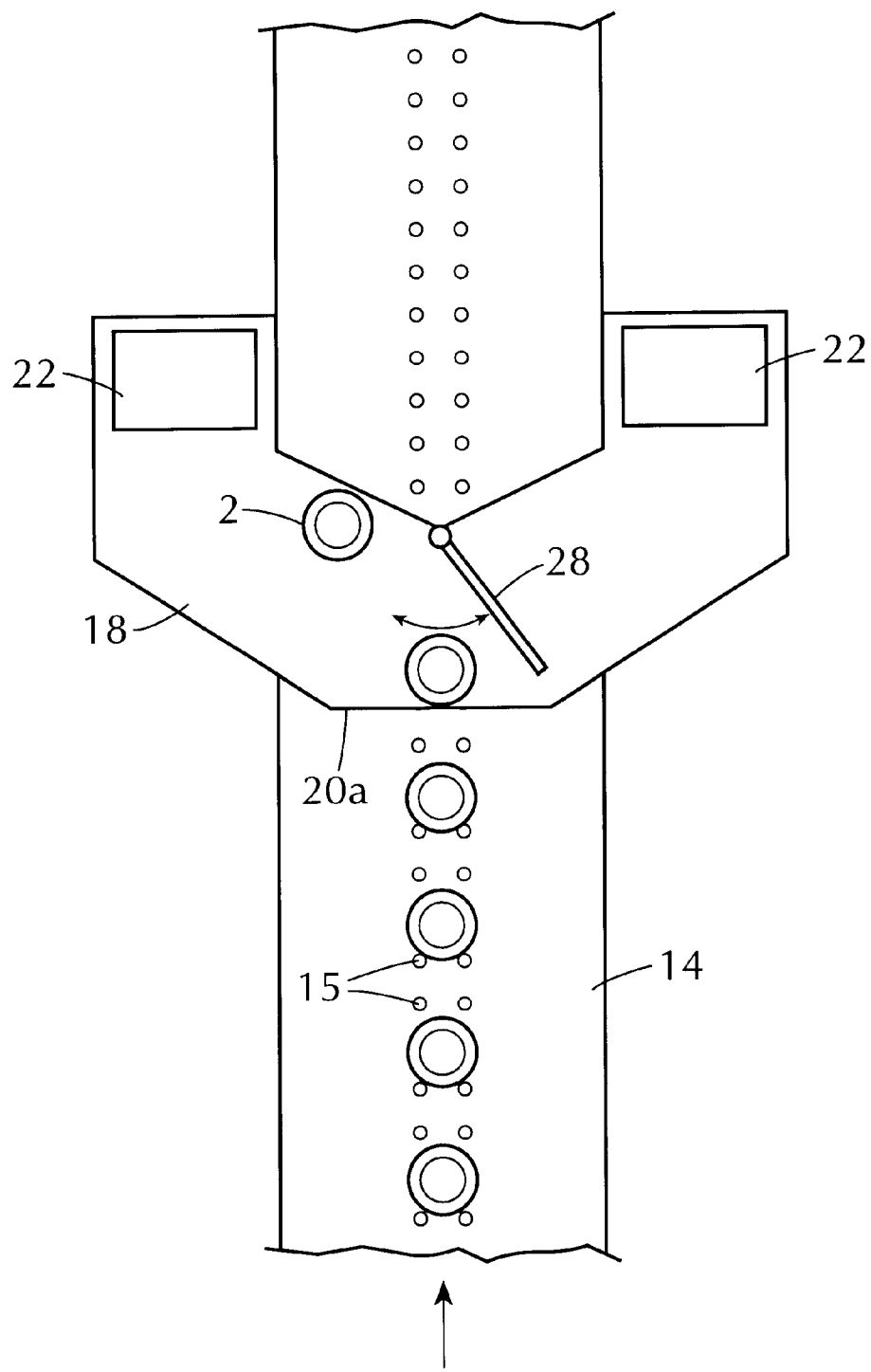
FIG. 5 is a top-plan view of a mechanical diverter for the piece count and collation system according to the present invention.

FIG. 5 illustrates another embodiment of a diverter 18 including a mechanical gate 28, positioned adjacent to the receiving area 20, which directs the flow of fully-wrapped objects, received from the conveyor, into one or the other exiting area. The gate may be timed, such that periodically, it allows objects to flow to a particular exit area, or it may be operated by a controller which swings the gate to allow objects to flow in either of the two exit areas based on a particular pattern.

Alternatively, one of the exit areas of the diverter may divert wrapped objects into a rejection hopper. Specifically, if fully wrapped objects are determined to be imperfect by, for example, the counting and/or inspection device, they are diverted to an exit area of the diverter which directs the imperfect items into a rejection bin.

Such imperfections may be that the wrapping is not properly sealed, the wrapping contains no object, the object contained in the wrapping is damaged, and the like.

Thus, when an imperfect wrapped object is detected by an inspection device which is in communication with a central controller of the piece count and collation system according to the present invention, the gate of the diverted may be commanded at the appropriate time to divert the imperfect item to the exit area of the diverter so that the item will be transported to a rejection bin.

The present invention is very adaptable to particular sizing/spacing requirements of a factory floor. Specifically, since vacuum is used to transport and guide objects, the rotating cylinders, rotating wheel 10, and conveyor 14 may be positioned at angles where gravity would normally play a role in the delivery of the product. Only the diverter and hoppers depend on gravity for the conveyance of objects in the present invention. However, one skilled in the art would appreciate that the embodiments of the present invention may be adapted for use in the diverter and hopper system as well.

Other variations and modifications of this invention will be apparent to those skilled in this art after careful study of this application. This invention is not to be limited except as set forth in the following claims.

What is claimed is:

1. A piece count and collation system comprising:
    a cut-and-seal apparatus including a pair of rotatable members positioned immediately adjacent each other for receiving a tube wrapping containing a plurality of sequentially spaced objects, said rotatable members rotating in opposite directions to one another and each comprising:
        a first cutting edge having a first bonding surface positioned immediately adjacent thereto;
        a second cutting edge spaced apart from said first cutting edge and having a second bonding surface positioned immediately adjacent thereto; wherein
    at least one of said rotatable members includes a vacuum grasping member positioned between said first and said second cutting edges for grasping one of said plurality of sequentially spaced objects in said tube wrapping received by said cut-and-seal apparatus while said tube-wrapping is cut and bonded on both ends to form a fully wrapped object; and
    a rotatable transfer member having a second vacuum assisted grasping member for receiving said fully wrapped object from said first vacuum grasping member.

2. The piece count and collation system according to claim 1, further comprising a vacuum conveyor that receives said fully wrapped object from said second vacuum assisted grasping member and transports said object in a linear direction away from said rotatable members.

3. The piece count and collation system according to claim 2, further comprising counting means positioned adjacent said conveyor.

4. The piece count and collation system according to claim 3, wherein said counting means comprises a sensor.

5. The piece count and collation system according to claim 3, wherein said counting means comprises an inspection device for counting and determining whether a wrapping includes an object therein.

6. The piece count and collation system according to claim 1, further comprising a conveyor for conveying wrapped objects from the transfer member, a diverter positioned downstream from said rotatable members, and at least two hoppers, wherein said diverter includes a receiving portion, at least two exiting areas and at least one diverting gate for directing said wrapped objects to one of said exiting areas, wherein each said exiting area diverts wrapped objects into a respective hopper for collecting said plurality of wrapped objects.

7. The piece count and collation system according to claims 6, wherein said diverter comprises two air diverter gates positioned on opposing sides of said conveyor.

8. The piece count and collation system according to claim 1, wherein said objects comprise confectionery.

9. The piece count and collation system according to claim 1, further comprising hoppers, said hoppers including a timing mechanism for allowing wrapped objects stored therein to empty into a container.

10. The piece count and collation system according to claim 1, further comprising a conveyor.

11. The piece count and collation system according to claim 1, further comprising a hopper for collecting a plurality of fully wrapped objects.

12. The piece count and collation system according to claim 1, further comprising a conveyor for conveying wrapped objects from the transfer member and at least one hopper for collecting a plurality of fully wrapped objects conveyed by said conveyor.

13. A piece count and collation system comprising:
- a cut-and-seal apparatus including a pair of rotatable members positioned immediately adjacent each other, one side of said cut-and-seal apparatus acting as a receiving side for receiving a plurality of sequentially spaced objects partially wrapped by tube-wrapping and an exiting side for dispensing said plurality of objects individually wrapped, said rotatable members rotating in opposite directions to one another and each comprising:
  - a first cutting edge having a first bonding surface positioned immediately adjacent thereto;
  - a second cutting edge spaced apart from said first cutting edge and having a second bonding surface positioned immediately adjacent thereto;
  - a first vacuum grasping member for grasping one of said plurality of partially wrapped objects while said tube-wrapping is cut and bonded on both ends to form a fully wrapped object;
- a third rotatable member including a second vacuum assisted grasping member for receiving said fully wrapped object from said first vacuum grasping member;
- a vacuum conveyor for receiving said fully wrapped object and transporting said object in a linear direction away from said third rotatable member;
- counting means positioned adjacent said conveyor;
- a diverter positioned downstream from said third rotatable member, said diverter having a receiving portion, three exiting areas and two air diverting gates on opposing sides of said conveyor and operated to direct said wrapped object into one of said three selected exiting areas, wherein each said exiting area diverts wrapped objects into a respective hopper for collecting a plurality of fully wrapped objects.

* * * * *